United States Patent [19]

Chu

[11] Patent Number: 5,920,899
[45] Date of Patent: Jul. 6, 1999

[54] ASYNCHRONOUS PIPELINE WHOSE STAGES GENERATE OUTPUT REQUEST BEFORE LATCHING DATA

[75] Inventor: Tam-Anh Chu, Vienna, Va.

[73] Assignee: Acorn Networks, Inc., Great Falls, Va.

[21] Appl. No.: 08/922,054

[22] Filed: Sep. 2, 1997

[51] Int. Cl.[6] .................................................. G06F 12/00
[52] U.S. Cl. ...................................... 711/169; 364/926.2
[58] Field of Search .................................... 711/109, 169; 377/64, 66; 364/926.1, 926.2, 926.5, 951; 365/221

[56] References Cited

U.S. PATENT DOCUMENTS

| | | |
|---|---|---|
| 4,819,201 | 4/1989 | Thomas et al. . |
| 5,550,780 | 8/1996 | Chu . |
| 5,663,994 | 9/1997 | Chu ........................................... 377/47 |

OTHER PUBLICATIONS

Kenneth Y. Yun et al., High–Performance Asynchronous Pipeline Circuits (Mar. 1996).

*Primary Examiner*—Eddie P. Chan
*Assistant Examiner*—Kevin Verbrugge
*Attorney, Agent, or Firm*—Morse & Altman

[57] ABSTRACT

An asynchronous pipeline that is divided into separate data and signal chains by moving the data register load signal buffer outside of the closed loop that generates the output request event from the input request event, causing the output request event to occur before output data is available. Matched delays between adjacent pipeline stages permit data and signals to move from stage to stage without problem. Matched delays between stages are possible if: (1) every stage has the same loading; (2) logically adjacent stages are physically located next to each other; (3) the buffered data register load signal has enough drive to latch data reliably; and (4) the delay from input request event to output request event is greater than the latch time of the data register. Input and output circuits transform the internal signals of the pipeline to the correct asynchronous signals for asynchronous source and destination devices or to the correct synchronous signals for synchronous source and destination devices.

22 Claims, 13 Drawing Sheets

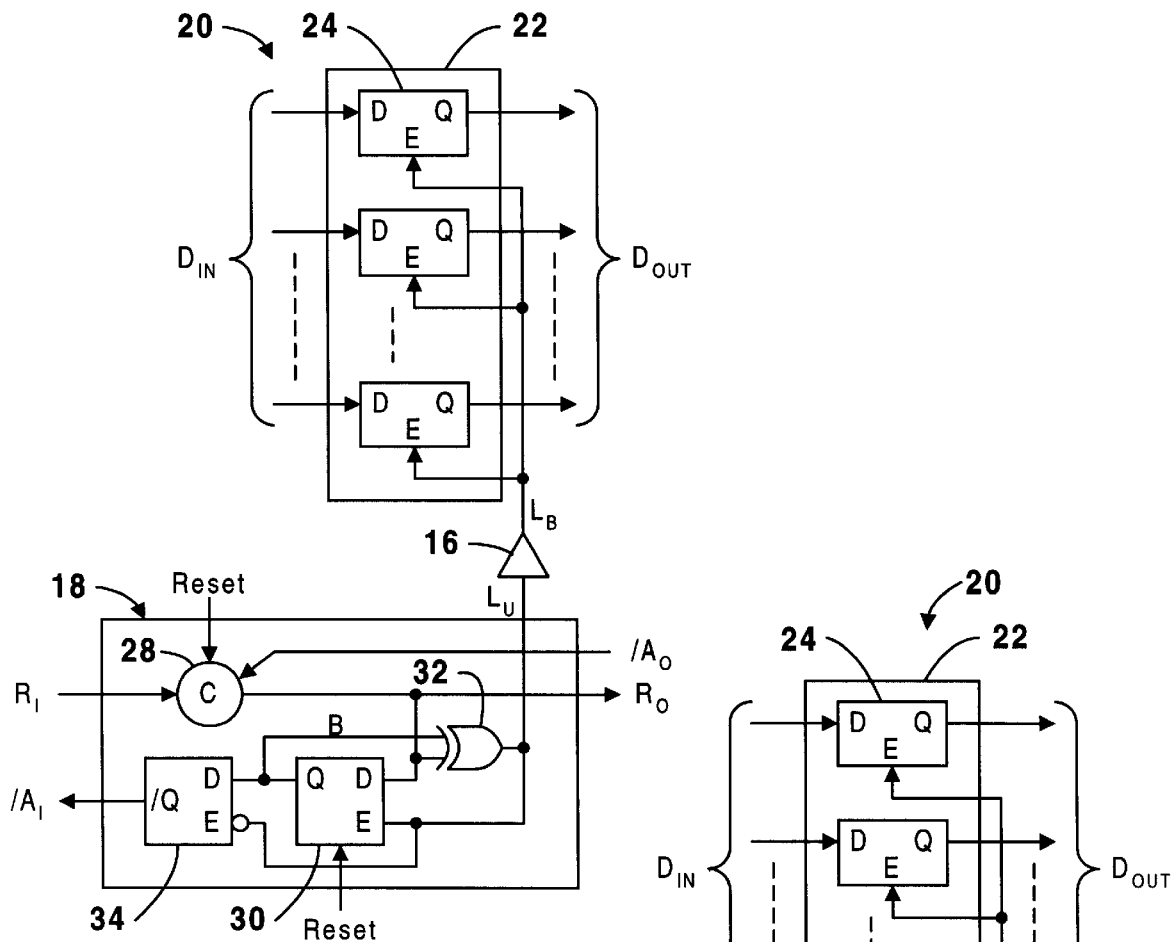
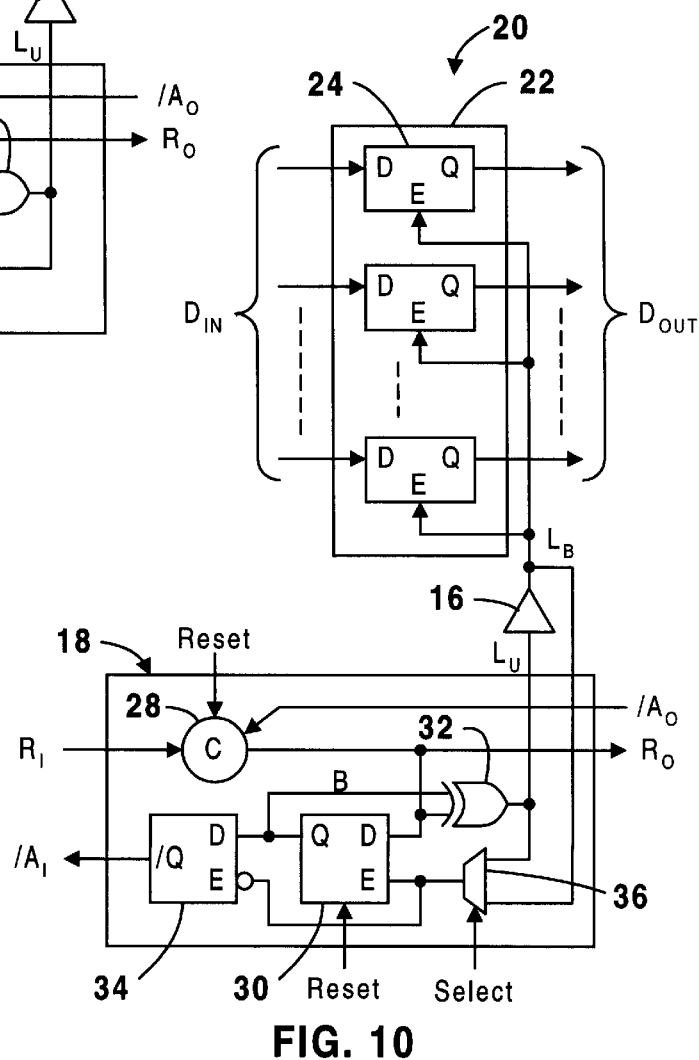
FIG. 9
FIG. 10

ASYNCHRONOUS PIPELINE WHOSE STAGES GENERATE OUTPUT REQUEST BEFORE LATCHING DATA

GOVERNMENT FUNDING

The research involved in this application was funded in part by the Naval Research Laboratory, contract number N00014-95-C-2216, dated Aug. 28, 1995. The intellectual property rights of the applicant and the government of the United States of America are governed by Title 37 Code of Federal Regulations Part 401.

BACKGROUND OF THE INVENTION

1. Field of the Invention

The present invention relates to electronic pipelines, more specifically, to pipelines in which data is transferred between internal stages asynchronously.

2. The Prior Art

Pipelining is a process by which an operation is separated into stages, where each stage is an independent component of the operation. Each stage of a pipeline operates on data passed to it from the previous stage, and when complete, passes the result to the next stage. Pipelining thus allows independent components of an operation to be performed concurrently, increasing throughput. The simplest example of a pipeline is the first-in/first-out buffer, or FIFO, which is used to transfer data between two independent devices in a way that maintains the independence of the devices. The FIFO stores the output from one device until needed by the next device, assuring that the data is received in the same order that it is generated. The first device stores its output in the FIFO at the rate it is generated, and the second device reads its input from the FIFO when needed, effectively coupling the two devices together with respect to data, but decoupling them with respect to timing. An important application for FIFOs is in the interface between a processor and a disk drive. The processor generates data to be written to the disk in infrequent, but high-speed bursts, and disk drive writes the data at a much slower, albeit steady, rate. Another important application for FIFOs is in data communication, where there is a need to buffer data between two systems that operate at different speeds.

A pipeline can be implemented to operate either synchronously or asynchronously. In synchronous operation, data movement from each stage of the pipeline to the next is controlled by a single global clock. In asynchronous operation, data movement between stages is controlled by a local handshake operation. When a stage has data ready for the next stage, it sends a request to that stage, and when that stage accepts the data, it returns an acknowledgement. There are a number of advantages that asynchronous pipelines have over synchronous pipelines. In a synchronous pipeline, it is assumed that the processing time of every stage is no greater than the time period of the clock. Consequently, the pipeline operates at the speed of the slowest stage, reflecting the worst-case time for the operation to complete. On the other hand, each stage of an asynchronous pipeline transfers data when ready, reflecting the average time for the operation to complete.

In a synchronous pipeline, the fastest speed is obtained when the clock period is as close as possible to the speed of the slowest stage. Careful planning and design are required to provide proper control to each stage. The physical layout of the pipeline must be designed to minimize the difference in time that the clock reaches all stages. The greater the difference, the slower the clock must be to accommodate the difference, resulting in slower operation. In an asynchronous pipeline, data transfer between stages is controlled locally, without dependence upon the other stages.

In a synchronous pipeline, the clock must always be active, so the stages are always active, consuming power. The clock can only be shut off with careful timing and after significant latencies. On the other hand, when there is no input data, an asynchronous pipeline ceases operation completely, consuming no power in typical designs. For high-speed designs that use a large number of pipelines, the power savings can be significant.

The design of an asynchronous pipeline is based on the serial connection of a number of pipeline stages, as shown in the four-stage pipeline 100 of FIG. 1. Each stage 102 includes a registered data path 104 and a stage controller 106. In the simple case of a FIFO, the registered data path 104 reduces to a data register 108. Each data register 108 has a number of identical cells 110, one for each bit in the width of the data, typically an integral power of 2, such as 8, 16, 32, or 64 bits. Unless specifically stated otherwise, all further references in this specification to a data register means a reference to all of the cells of the data register. Data enters the first stage data register 108 through the entry port $D_{IN}$ and is sequentially transferred from one data register 108 to the next until it is available as output data at the output port $D_{OUT}$.

Data moves into and out of a stage 102 under the control of the stage controller 106. The stage controller 106 generates a load signal L to the data register 108, causing the data register 108 to latch the data at its input $D_I$. A short time later, represented by the propagation delay through the data register 108, the data becomes available at the register output $D_O$. The data transfer is coordinated by a pair of handshake signals between stage controllers 106 of adjacent stages 102. The signal pair include a request signal R and an acknowledge signal A. Together they form a closed-loop communication between two adjacent stages. Basically, when a stage 102 has data available at its output $D_O$, it asserts the request signal R. When the succeeding stage has accepted the data, it asserts the acknowledge signal A.

There are two protocols used to transfer data between stages, four-cycle signaling and two-cycle signaling, shown in the timing diagrams of FIGS. 2a and 2b, respectively. In four cycle signaling, a signal is always asserted by the same transition of the signal line, illustrated as a low-to-high transition in FIG. 2a. After the data is available from the sender, the sender changes R from low to high. The receiver acknowledges the data by changing A from low to high. Upon receiving the low-to-high acknowledgement, the sender resets the R to low, and upon seeing R go low, the receiver resets A to low. The term four-cycle refers to the fact that there are four transitions of the two signal lines during a transfer.

In two-cycle signaling, a signal is asserted by any transition of the signal line, called an event. After data is available from the sender, the sender changes the state of R, either from low-to-high or from high-to-low, causing an event on R. The receiver acknowledges receipt of data by changing A to its opposite state, causing an event on A. No other transitions of R and A are involved. Two-cycle signaling is potentially twice as fast as four-cycle signaling, the expense being a more complicated circuit implementation. Thus, for maximum throughput of a pipeline, two-cycle timing is preferred.

A block diagram of a pipeline stage 120 with a two-cycle stage controller 122 is shown in FIG. 3 and the associated timing diagram is shown in FIG. 4. The nomenclature used in the art is that the input request signal is $R_I$, its associated acknowledge signal is $A_I$, the output request signal is $R_O$, and its associated acknowledge signal is $A_O$. The stage controller has a latch 126 to generate $R_O$, a latch 128 to generate $A_I$, and a logic circuit 130 to generate L for the data register 124. A cycle begins by an event on $R_I$. If there is no data in the data register 124, as indicated by an $A_O$ event in the previous cycle, the $R_I$ event causes L to be asserted, latching the data $D_I$ from the previous stage into the data register 124. The $R_I$ event also causes an event on $R_O$, signaling to the next stage that the data $D_O$ at the output of the data register 124 is available. The $R_O$ event causes L to be deasserted, which, in turn, causes an event on $A_I$, indicating to the previous stage that its data $D_I$ has been accepted, and terminating the cycle. Meanwhile, the next stage has acknowledged the $R_O$ event by an event on $A_O$. The next cycle begins by a $R_I$ event, but this does not cause L to be asserted until the data $D_O$ has been read by the next stage, indicated by an $A_O$ event in the previous cycle.

The throughput of a single stage of a two-cycle asynchronous FIFO is $1/T_{CYCLE}$, where $T_{CYCLE}$ is the maximum of the delays between consecutive events on $R_I$, $A_I$, $R_O$, and $A_O$, that is $$T_{CYCLE} = max(T_{RI}, T_{AI}, T_{RO}, T_{AO})$$

where $T_{RI}$, $T_{AI}$, $T_{RO}$, $T_{AO}$ represent the greater of the positive transition time and the negative transition time of each signal. Thus, to increase the throughput of the pipeline, $T_{CYCLE}$ must be decreased.

In most state-of-the-art pipelines 140, a single stage of which is shown in FIG. 5, the width of the data register 142 can be large, 64, 128, or more bits. For each one of these bits, the data register 142 includes a data register cell 144 to hold the data. Each of these cells 144 must be driven by the load signal L in order to latch in the data. Because of the large number of loads on L, a buffer 146 is needed to provide adequate rise and fall times for the load signal $L_B$.

The timing diagram for the FIFO of FIG. 5 is shown in FIG. 6. To guarantee that the data $D_{IN}$ has been successfully loaded into the data register 142, the buffered load signal $L_B$, rather than the unbuffered load signal $L_U$, is monitored, and $A_I$ and $R_O$ are issued only after $L_B$ has indicated that data $D_{IN}$ has been safely latched into the data register 142. This introduces an extra delay $T_B$ to $T_{CYCLE}$, which adversely affects the throughput of the system.

A typical FIFO includes a 64-bit-wide register and uses 0.5 micrometer CMOS technology. In this system, $T_{CYCLE}$, when excluding $T_B$, is approximately 3 nanoseconds (ns) which results in a throughput of approximately 333 MHz. The buffer needed to drive a 64-bit register has a delay $T_B$ of approximately 3 ns. This buffer delay essentially doubles $T_{CYCLE}$, from 3 ns to 6 ns, resulting in a 50% reduction in throughput from 333 MHz to 167 MHz. This situation will not improve with future submicrometer technologies because wire delays will become a more significant factor in the total delay $T_{CYCLE}$ and because data paths will increase in width, requiring buffers with greater drive capability and the resulting greater buffer delays. The time needed to load data into a data register will remain at approximately 50% of total cycle time.

SUMMARY OF THE INVENTION

An object of the present invention is to provide a pipeline that increases overall throughput significantly over those of the prior art.

Another object is to provide a pipeline that moves data through empty stages faster than in pipelines of the prior art.

Yet another object is to provide a pipeline that minimizes the amount of time that the source device is forced to wait before writing data to the pipeline.

The present invention is an asynchronous pipeline that maximizes throughput. When the first stage of a pipeline is full, the source device must wait to write the next piece of data into the pipeline. The pipeline of the present invention seeks to minimize this wait by emptying the first stage into the second stage, and so on, as fast as possible so that the source can write its next piece of data into the first stage as soon as possible.

The present invention essentially divides the pipeline into separate data and signal chains by moving the data register load signal buffer outside of the closed loop that generates $A_I$ and $R_O$. Consequently, $L_B$ is no longer used in the handshake timing, but merely synchronizes the data chain with the signal chains.

When data is available from the previous stage, it causes an event on $R_I$, which, assuming that the next stage is empty, generates an event on $R_O$ a time interval $T_C$ later. The $R_O$ event causes a circuit to generate a pulse on the data register load signal $L_U$, causing the buffered load signal $L_B$ to pulse a time interval $T_Z$ after $R_O$, latching the data into the data register. The output data is available a time interval $T_D$ after the buffered load signal $L_B$. Finally, the trailing edge of $L_U$ causes an event on $A_I$, indicating to the previous stage that the data has been accepted. As can be seen, the $R_O$ event occurs $T_Z+T_D$ before the output data is actually available, which is a violation of asynchronous handshake timing requirements. This violation is inconsequential as long as the last stage of the pipeline makes the output data available before causing an $R_O$ event.

At the internal stages of the pipeline, delay matching of the stages is the key for proper operation. As stated above, the output data is not available until $T_Z+T_D$ after the $R_O$ event. However, as long as the stages have matched delays, the load signal to latch the output data into the next stage does not occur until $T_C+T_Z$ after the $R_O$ event. Consequently, as long as $T_C$ is greater than $T_D$, there is no problem with the handshake violation. In order to guarantee that the delays are matched between stages, four requirements must be met: (1) that every stage has the same loading; (2) that the logically adjacent stages are physically located next to each other; (3) that the buffered load signal $L_B$ has enough drive to latch data reliably; and (4) that $T_C$ is greater than $T_D$.

The simplest form of a pipeline is a FIFO, where no transformative processing of the data takes place. In the general asynchronous pipeline, each stage has a logic circuit to process the data along with the data register, and the logic functions are not necessarily the same from one stage to the next. In order to meet the delay matching requirement, the worst case propagation delay path of the logic function is identified and delay circuit matching that delay that is inserted between $R_O$ of the stage and $R_I$ of the next stage. The delay circuit essentially eliminates the effect of the logic circuit propagation delay.

The pipeline of the present invention must interface to external source and destination devices, which are either asynchronous or synchronous. To interface to an asynchronous source device, the first stage merely delays the event on $A_I$ until the input data is latched. To interface to an asynchronous destination device, the last stage merely delays $R_O$ until the output data is available. Interfacing to synchronous devices is more complicated, requiring conversion circuits to convert the non-standard handshake signals of the pipeline of the present invention to the clock-controlled signals of the synchronous source or destination device.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 9 is a detailed block diagram of a single stage of the FIFO of FIG. 7 showing a preferred controller design;

FIG. 10 is a detailed block diagram of a single stage of the FIFO of FIG. 7 showing an alternate preferred controller design;

DETAILED DESCRIPTION

The present invention is an asynchronous pipeline design and stage controller that maximizes throughput of the pipeline. When the first stage of a pipeline is full, the source device must wait to write the next piece of data into the pipeline. The pipeline controller of the present invention seeks to minimize this wait by emptying the first stage into the second stage, and so on, as fast as possible so that the source can write its next piece of data into the first stage as soon as possible. Consequently the source device does not have to wait as long or as often for the pipeline.

Figure 1:
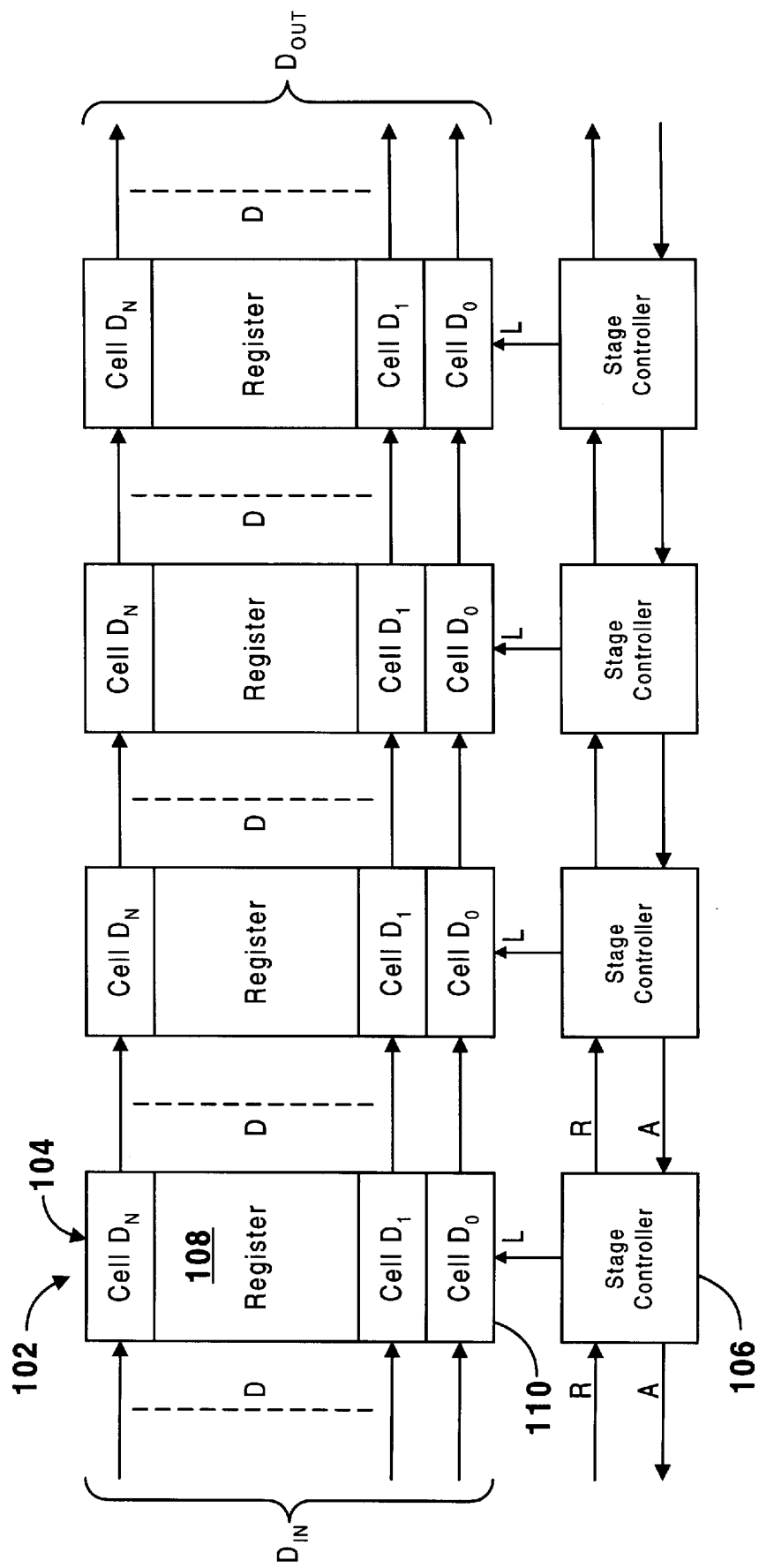
FIG. 1 is a block diagram of a four-stage prior art asynchronous pipeline.
Figure 2A:
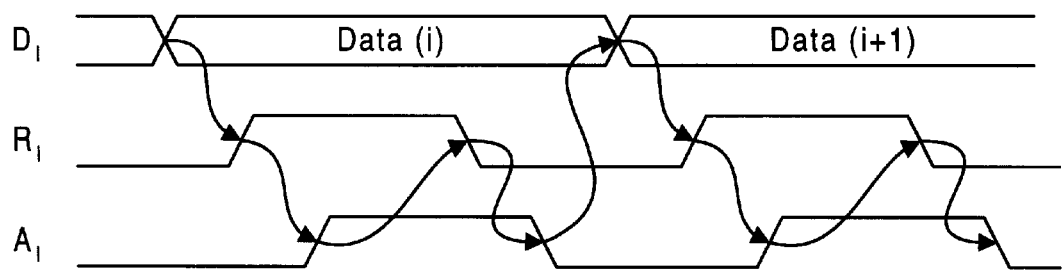
FIG. 2a is a timing diagram of a four-cycle handshake between two stages of the pipeline of FIG. 1.
Figure 2B:
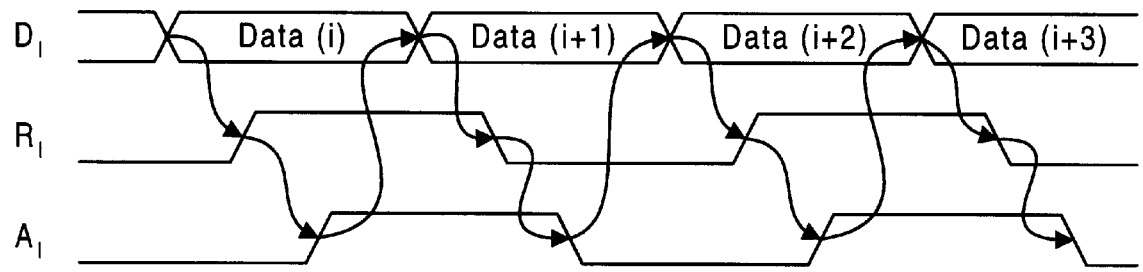
FIG. 2b is a timing diagram of a two-cycle handshake between two stages of the pipeline of FIG. 1.
Figure 3:
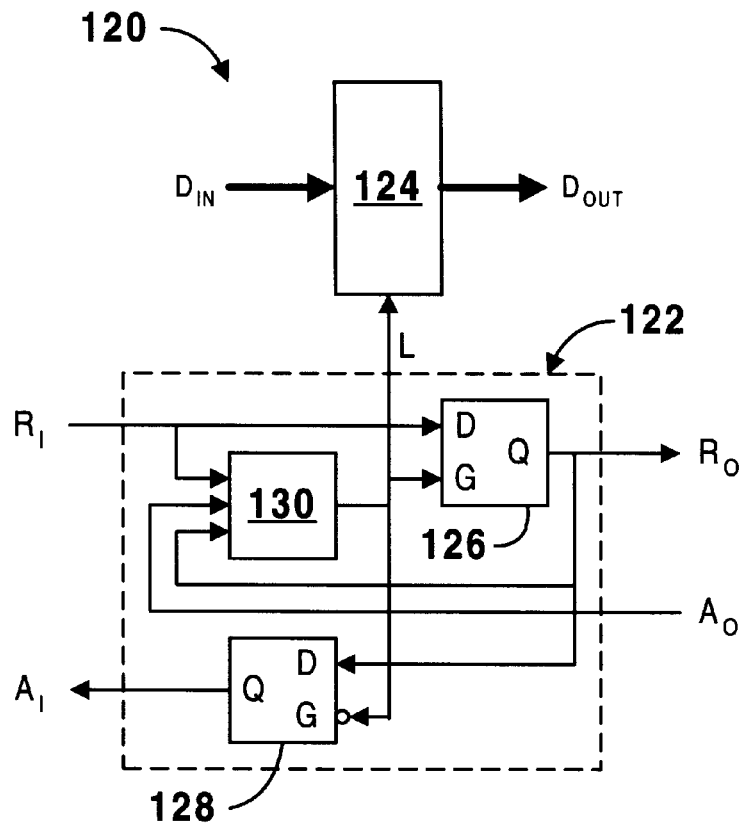
FIG. 3 is a block diagram of a simple prior art asynchronous FIFO stage.
Figure 4:
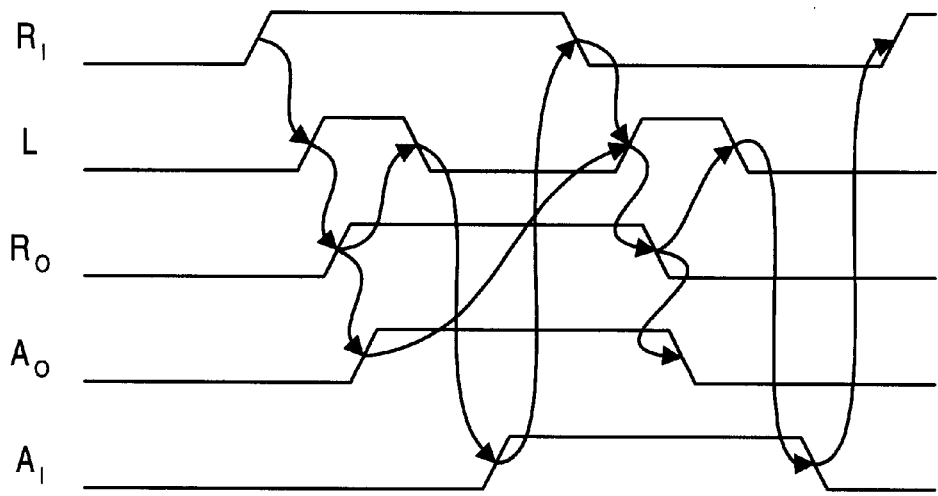
FIG. 4 is a timing diagram of the FIFO of FIG. 3.
Figure 5:
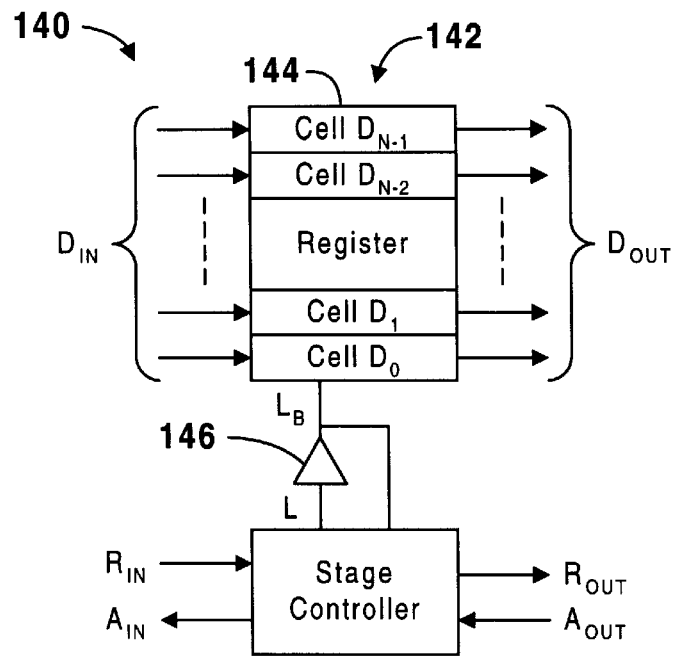
FIG. 5 is a block diagram of a buffered prior art asynchronous FIFO stage.
Figure 6:
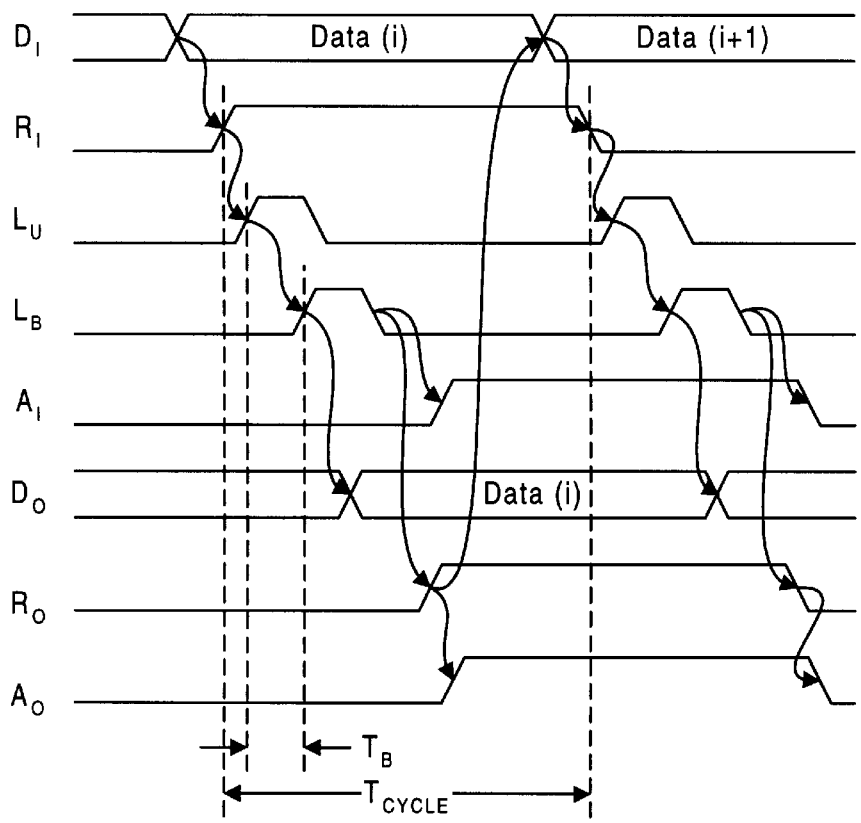
FIG. 6 is a timing diagram of the FIFO of FIG. 5.
Figure 7:
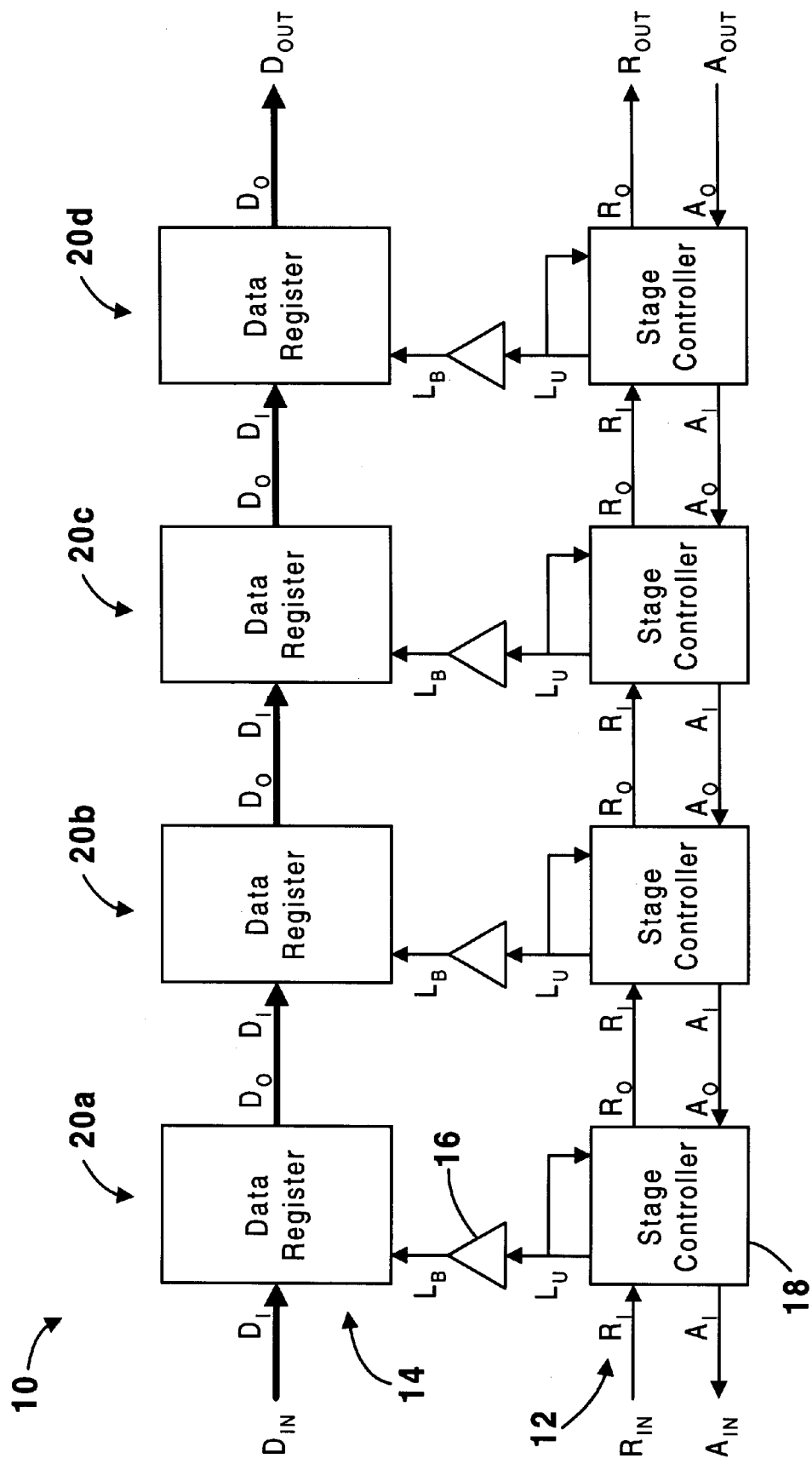
FIG. 7 is a block diagram of a four-stage asynchronous FIFO implementing the present invention.

As shown in FIG. 7, the present invention essentially divides an asynchronous FIFO 10 into two separate and parallel chains by moving the data register load signal buffer 16 outside of the closed loop that generates $A_I$ and $R_O$. Instead of using $L_B$ to indicate that the data has been stored and is now available to the next stage, $L_U$ is used to indicate that the data storage will begin. The two chains are the signal chain 12 involving $R_I$, $A_I$, $R_O$, and $A_O$ of the stage controller 18, and the data transfer chain 14 involving $L_B$, $D_I$, and $D_O$. The signal chain 12 performs the handshake between stages 20 and the data transfer chain 14 propagates data from one stage 20 to the next through the action of $L_B$ generated at each stage 20. Both chains 12, 14 are triggered by an event on $R_I$ of the first stage 20a.

Figure 8:
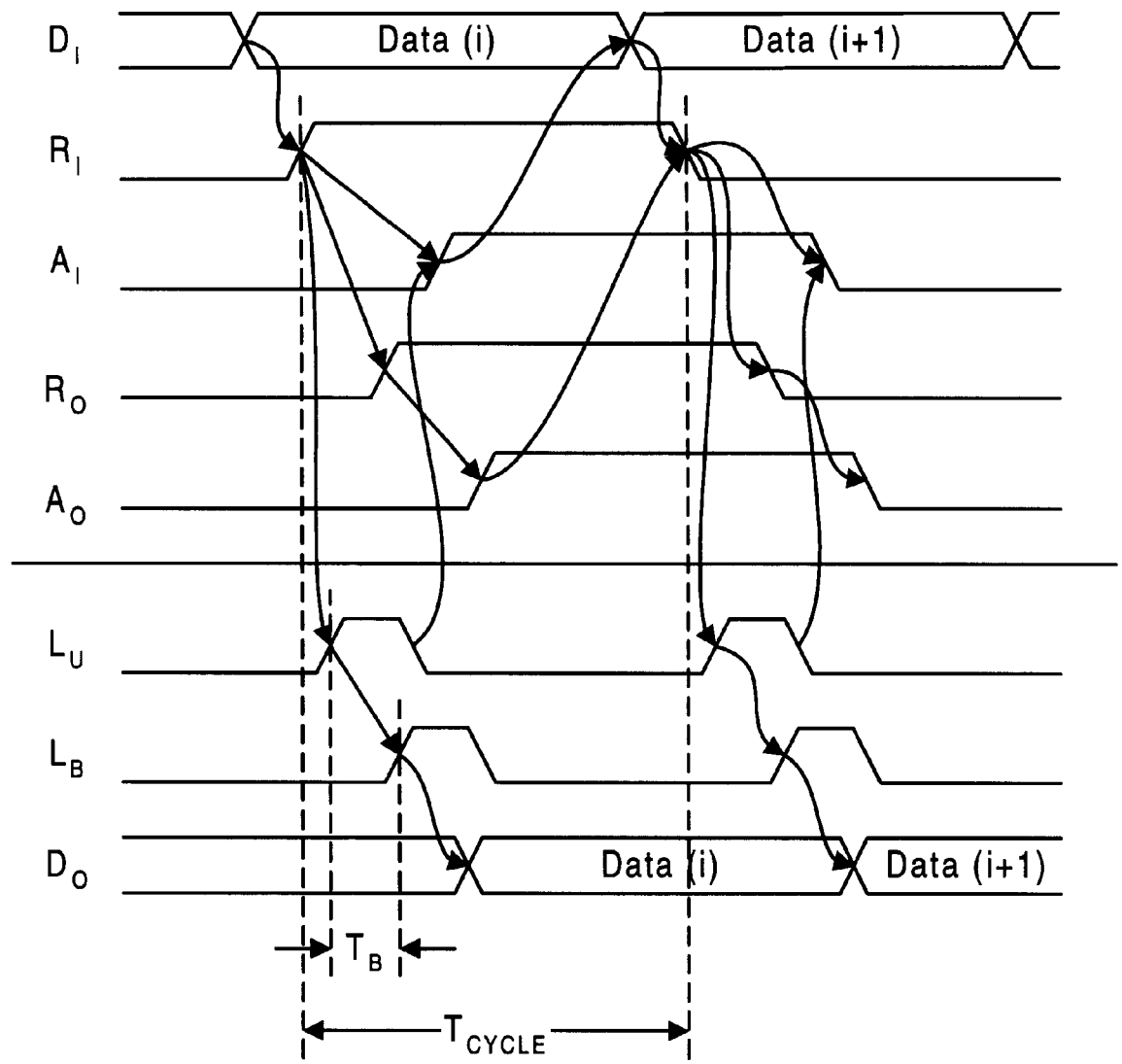
FIG. 8 is a timing diagram of the FIFO of FIG. 7.

A timing diagram for the FIFO of FIG. 7 is shown in FIG. 8. When data is available from the previous stage at $D_I$, the previous stage causes an event on $R_I$. Assuming that the data register 22 is empty or has already been read by the next stage, the $R_I$ event causes an event on $R_O$, indicating that the data is available at the output $D_O$. The $R_I$ event also causes $L_U$ to rise. The data register load signal $L_B$ occurs $T_B$ later, latching the data into the data register 22. Finally, the $R_I$ event causes an event on $A_I$, indicating to the previous stage that the data has been accepted.

As can be seen, the $R_O$ event can occur before $D_O$ is actually available, which is a violation of handshake timing requirements. However, as will be shown below, this violation is inconsequential as long as the last stage 20d of the FIFO makes $D_O$ available before causing an $R_O$ event.

Figure 11:
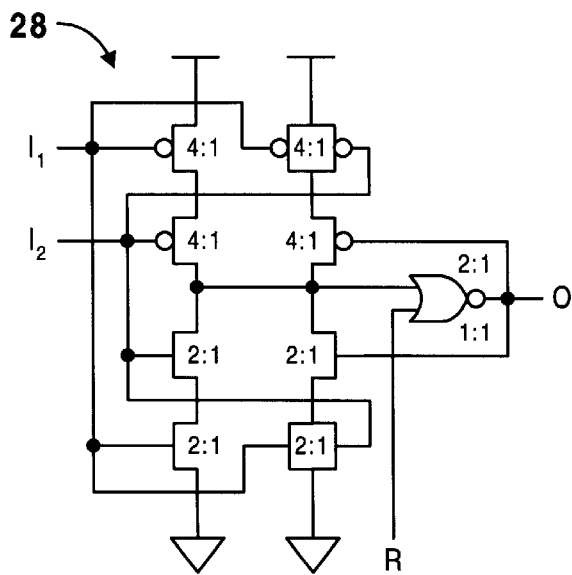
FIG. 11 is a detailed schematic of a C-element as used in the present invention.

Block diagrams of two preferred stage controllers 18 are shown in FIGS. 9 and 10. The C-element 28, a detailed CMOS schematic of which is shown in FIG. 11, is logic gate where the output O remains constant as long as the inputs are different. When the inputs $I_1$, $I_2$ become equal and different from the output O, the output O changes to the input level. For example, if the output O is low, it will remain low as long as at least one of the inputs $I_1$, $I_2$ is low. When both inputs $I_1$, $I_2$ become high, the output O will become high. A high level on the reset signal R sets the output O low. If a reset is not needed, the NOR gate is replaced by an inverter. If a set signal is desired, the NOR gate is replaced by a NAND gate, where a high level on the second input to the gate allows for normal operation and a low level sets the output O high.

Figure 12:
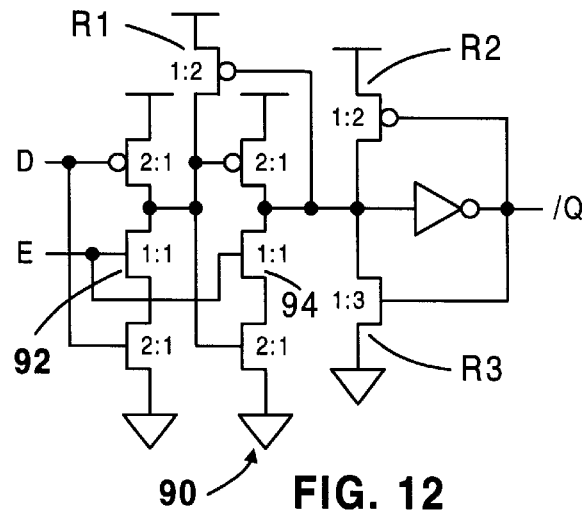
FIG. 12 is a detailed schematic of a static true single-phase latch as used in the present invention.

A true single-phase latch (TSPL), a detailed CMOS schematics of which is shown in FIG. 12, is a latch whose operation requires only one phase of the clock (or enable signal). A conventional CMOS latch uses both phases of the clock to control the CMOS transmission gates required in the implementation, where the true phase performs an internal data transfer from the input and the complement phase performs an internal data transfer to the output. On the other hand, in a TSPL, both transfers occur on the same clock edge, removing any skew between the true and complement clock signals. Thus, a TSPL can be clocked at a much higher speed than conventional CMOS latches, resulting in a smaller delay and greater throughput.

A feature of the TSPL for use in the present invention is the addition of the three elements $R_1$, $R_2$, $R_3$. These elements combine to make the TSPL a static, rather than dynamic, device. All three are weak devices, having a strength of less than 1:1. In other words, their outputs are easily overdriven by the other devices driving the same node. The pull-up device $R_1$ makes sure that the input to the second totem 90 does not float when the latch enable E is not active. The other two elements $R_2$, $R_3$ combine to form a feedback inverter. They guarantee that the output will remain constant when the output of the second totem is floating.

Figure 13:
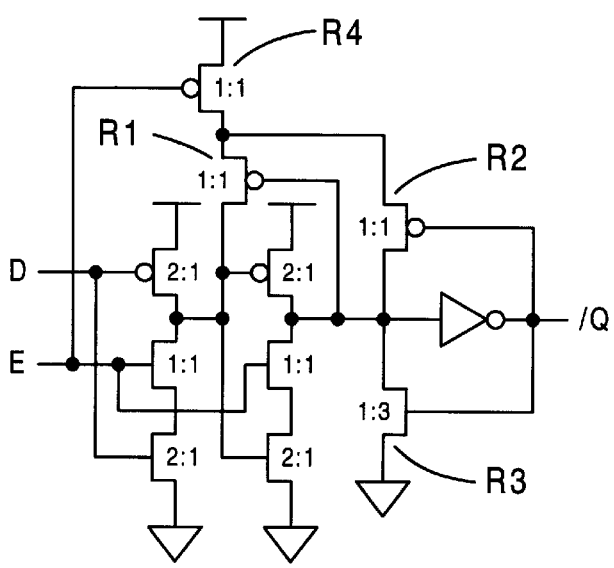
FIG. 13 is a detailed schematic of a lower-power version of the static true single-phase latch of FIG. 12.

An optional feature, used in conjunction with the static feature above and shown in FIG. 13, is the addition of the element $R_4$, a device that supplies power to the pull-up elements $R_1$ and $R_2$ only when the latch enable E is not active. Since $R_1$ and $R_2$ only need to be active when the latch enable E is not active, a power savings is realized. In addition, since $R_1$ and $R_2$ are active only when no other drivers on the node are active, they do not have to be weak devices because they no longer have to be overdriven.

If a TSPL with a negative enable is desired, the gate of the center devices 92, 94 is changed from non-inverting to inverting. In addition, device $R_1$ is converted from a pull-up to a pull-down and its gate is changed from inverting to non-inverting. If a reset signal is desired, the inverter 96 is replaced by a NAND gate, where a high level on the second input to the gate allows the TSPL to operate normally and a low level resets the output /Q high.

Returning to FIGS. 9 and 10, the data register 22 is composed of N TSPL register cells 24 in parallel, where N is the width of the data in bits. Each input D is driven by one of the data signals comprising $D_{IN}$. The combination of all of the cell outputs Q is the data output $D_{OUT}$. The cell load signals E are driven simultaneously by $L_B$ from the load signal buffer 16.

In the stage controller 18, the C-element 28 generates $R_O$ from $R_I$ and /$A_O$, the logical inversion of $A_O$. The purpose of using the C-element 28 to combine /$A_O$ and $R_O$ is to prevent an event on $R_O$ if the next stage is not empty. $R_O$, in exclusive-OR combination with an internal signal B, is used to assert $L_U$, which, in turn, drives the load signal buffer 16. $L_U$ also clocks $R_O$ into an internal TSPL 30 to generate B, which feeds back to the XOR gate 32 to deassert $L_U$. The falling edge of $L_U$ clocks the TSPL 34 used to generate /$A_I$, the logical inversion of $A_I$, to indicate to the previous stage that the data has been accepted.

Figure 14:
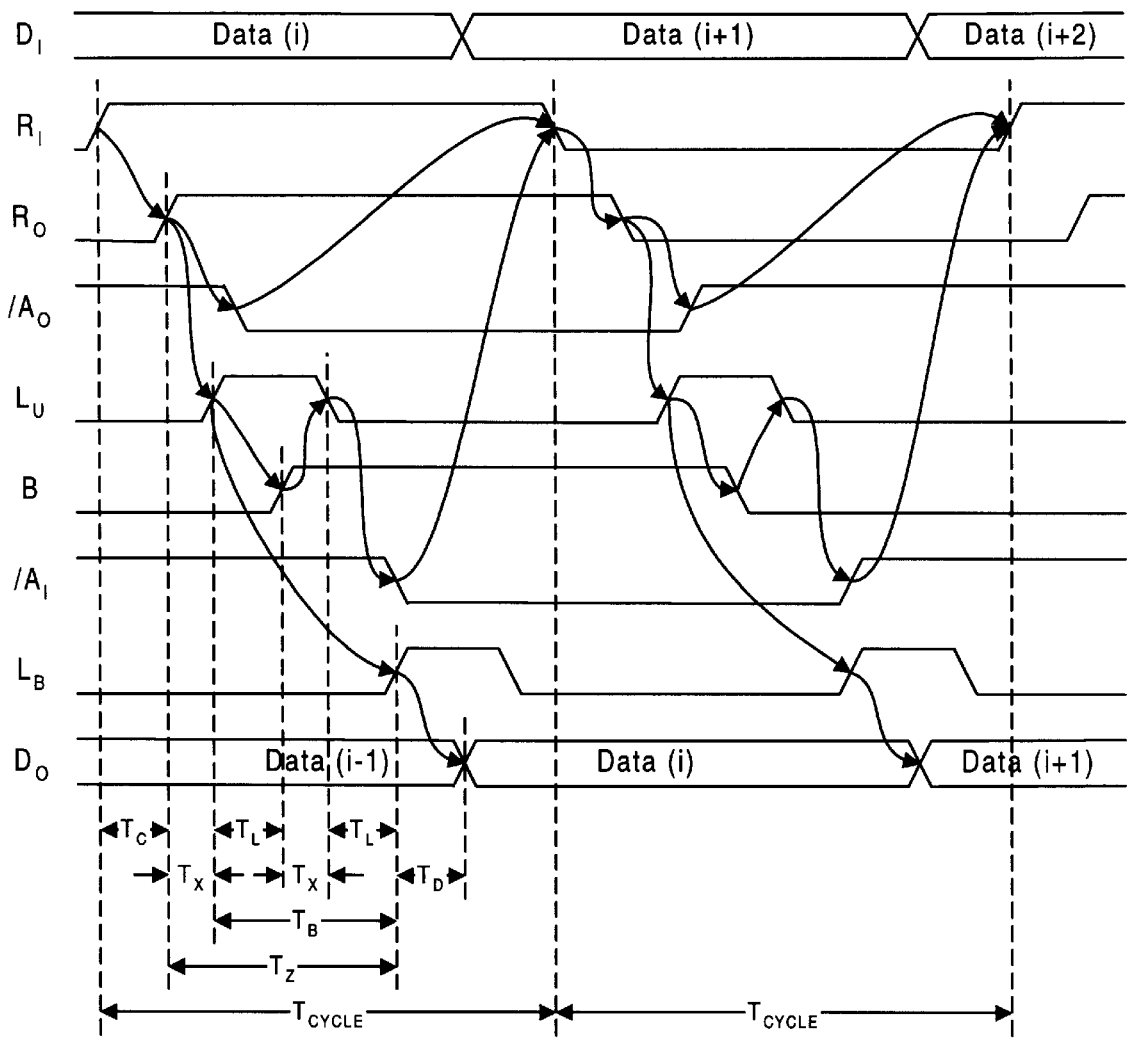
FIG. 14 is a timing diagram of a stage controller of FIG. 9.

The timing of the stage controller 18 of FIG. 9 is shown in FIG. 14. This timing diagram assumes that the previous and next stages include stage controllers of the same design and that the FIFO has just been reset. An $R_I$ event occurs, starting $T_{CYCLE}$. After a propagation time $T_C$ through the C-element 28, an $R_O$ event occurs, indicating to the next stage that data is available at $D_O$, although the data is not actually available yet. After a propagation time $T_X$ through the XOR gate 32, the load signal $L_U$ goes high. On the rising edge of $L_U$, $R_O$ is clocked into the internal TSPL 30, sending internal signal B to a high level after the TSPL propagation time of $T_L$. A high level on B causes $L_U$ to go low after a delay of $T_X$. Consequently, the width of the load signal $L_U$ is the sum of $T_L$ and $T_X$. On the falling edge of $L_U$, B is clocked into the $A_I$ TSPL 34, causing an event on /$A_I$, indicating to the previous stage that its data $D_I$ has been loaded. Meanwhile, after a propagation time of $T_B$ through the load signal buffer 16, the data at $D_I$ is loaded into the data register 22 by $L_B$, which occurs at time interval $T_Z=T_X+T_B$ after the $R_O$ event. $D_O$ becomes available to the next stage after a propagation time of $T_D$ through the data register 22. The next cycle does not begin until /$A_O$ is received by the C-element 28.

Note that the $R_O$ event occurs $T_Z+T_D$ prior to the time that the data is actually available at $D_O$. As indicated above, this is a fundamental violation of the handshake timing for normal asynchronous communications. However, there is no need for normal handshake timing between stages provided that the handshake signals and data remain synchronized. The load signal provides this synchronization.

At the internal stages, delay matching is the key for the FIFO to operate properly. Essentially, each stage must have nearly the same propagation delays, and the propagation delays between adjacent pairs of stages must be approximately the same. When the stages 20 have the same propagation delays, the data will not actually be loaded into the data register 22 when the stage controller 18 receives the $R_I$ event. Rather, the $R_I$ event propagates through the stage controller 18 before the $L_B$ pulse occurs, which is $T_C+T_Z$ after the $R_I$ event. And if the stage delays are matched, it is the same $T_C+T_Z$ amount of time that the $R_O$ event occurs before the data $D_O$ is actually available in the previous stage. Thus, the data and handshake signals propagate through the FIFO at the same speed, where the data is behind the handshake signals by the amount of time equal to the delay from $R_I$ to $L_B$, which is $T_C+T_Z$.

Propagation delays depend upon the physical parameters of the stages. If the four requirements described below relating to the layout and components of each stage are met, delay matching is easily accomplished.

The first layout requirement is that every stage has the same loading. There will always be variations between the parameters of two components that are designed to be the same. As a result, there will always be at least slight differences in the operation and propagation delay between components. This first rule acknowledges that there will be differences and seeks to minimize their effects by making the timing within each stage be the same as all other stages.

The second requirement is that the logically adjacent stages are physically located next to each other. Process parameters vary over the area of an integrated circuit. Putting logically adjacent stages next to each other minimizes the variations between stages, essentially making the variations negligible and providing the adjacent stages with similar delays.

The third requirement is that the buffered load signal $L_B$ have enough drive to latch data reliably. The load signal buffer 16 must be able sink or source enough current (depending on the data register type) to provide adequate rise and fall times for the load signal. As described above with reference to FIGS. 9 and 14, the length of the load signal pulse is $T_X+T_L$, a relatively short time span. However, the rise and fall times of the pulse determine the actual length of time of the load signal pulse as seen by the data register. As the rise and/or fall times increase, the load signal pulse effectively shortens. If the load signal pulse is too short, there will not be enough time to latch the data into the data register before the load signal pulse terminates, leading to indeterminate data at the output. The determining factor in how long the load signal pulse must be is the propagation delay through the data register. For a traditional latch, the delay is approximately that of two inverters. Thus, the length of the load signal pulse would need to be at least that of two inverter delays. If TSPLs are used for the data register, the propagation delay is shorter, so a shorter load signal pulse is necessary.

The final requirement is the data register 22 forward data from one stage to the next no slower than the $R_I$-to-$R_O$ delay of the stage controller 18. In other words, the propagation delay $T_D$ of the data register must be no greater than the propagation delay $T_C$ through the C-element 28. When $A_O$ is inactive, meaning that the next stage is empty, the handshake signals will propagate to the next stage with a speed of $T_C$. Thus, in order to keep up, the data must travel at least as fast. This way, a data travels from stage to stage at the same rate as the handshake signals. In the event that $T_D$ is less than $T_C$, so that the data could potentially move faster than the handshake signals, it will have to wait for the load signal $L_B$ to arrive before it can be forwarded to the next stage. Thus, the load signal $L_B$ synchronizes the data and signals so they travel through the FIFO at the same speed.

FIG. 10 shows a modification to the basic stage controller design. In some situations, it is necessary to lengthen the load signal $L_B$ or to delay the $A_I$ event to guarantee that data is loaded before the $A_I$ event occurs. An example of such a situation is when the device sourcing data to this stage implements a normal handshake protocol and expects that it can remove or change the data as soon as it receives an $A_I$ event. A multiplexer 36 is inserted between the XOR output $L_U$ and the D TSPL clock input E. The second input of the multiplexer 36 is $L_B$. When the multiplexer 36 is selected to use the $L_B$ input, the load signal $L_B$ is lengthen by $T_B$, the load buffer delay, and the $A_I$ event is delayed by $T_B$. A penalty is paid by the versatility gained. Like any other logic gate, the multiplexer 36 has a propagation time $T_M$, which increases the $R_I$-to-$A_I$ time by about 10% when $L_U$ is selected. Consequently, the throughput of the FIFO is reduced by approximately 10%, even if $L_U$ is selected.

Figure 15:
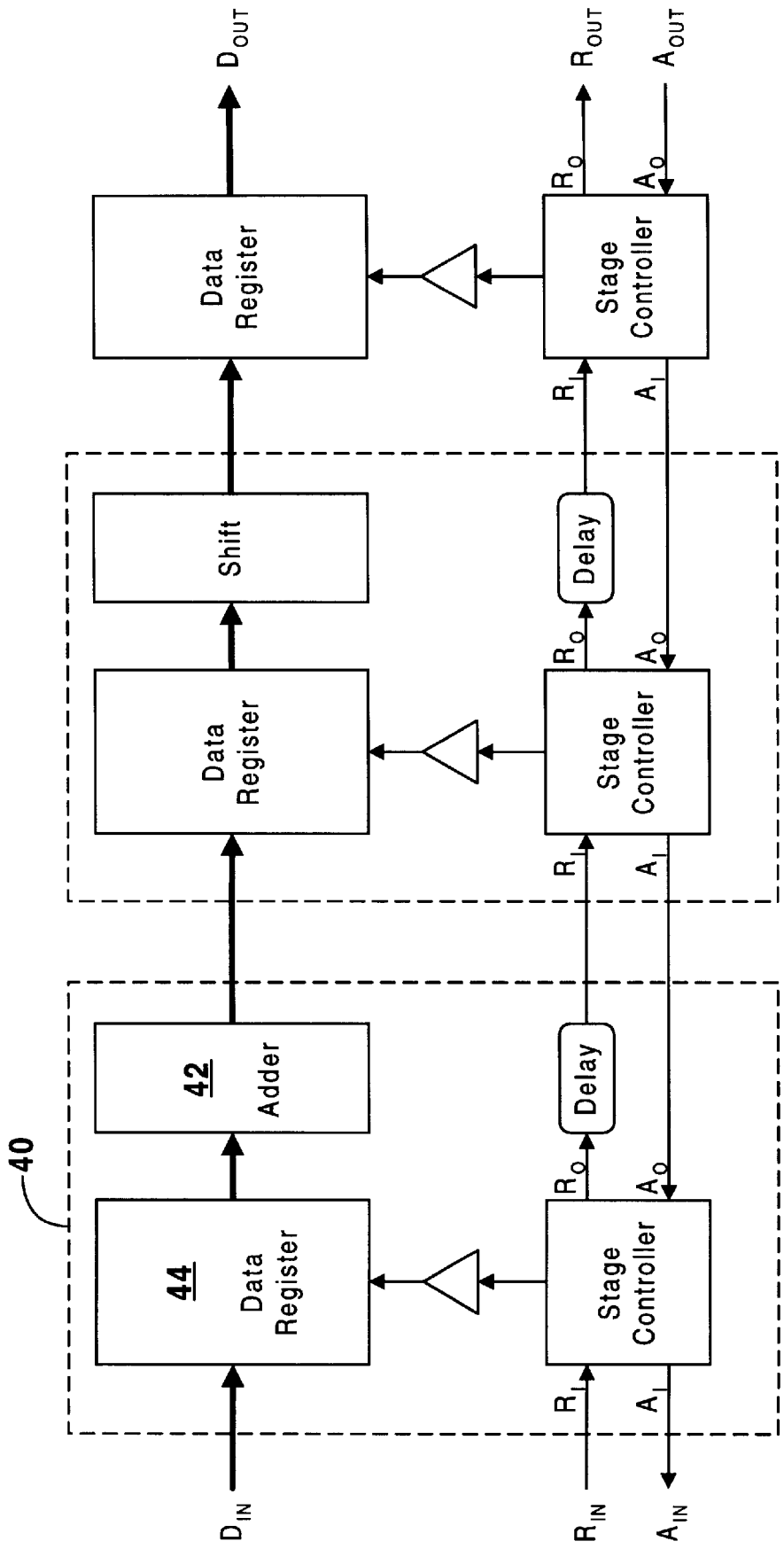
FIG. 15 is a block diagram showing how the present invention is extended to a general asynchronous pipeline.

The previous discussion of the present invention has been relative to a FIFO, which is the simplest form of a pipeline. In a FIFO, no transformative processing of the data takes place within stages. FIG. 15 shows how the present invention can easily be extended to general asynchronous pipelines that have functions more complicated than storing and forwarding data. A pipeline stage 40 stores data for use by a logic function circuit 42 of the stage. Consequently, the logic function circuit 42 is inserted into the stage 40 after the register 44. There is no requirement that the logic function 42 be the same for each stage and, in fact, in the typical complex pipeline, they are not the same. The worst case propagation delay path of the logic function 42 is identified, which has a time interval $T_P$, and replicated to generate a matched delay circuit 46 that is inserted between $R_O$ of the stage and $R_I$ of the next stage. This delay circuit 46 delays the event on $R_O$, not until the logic function circuit 42 is complete and the data is available, but until $T_Z+T_D$ before the data is available. The delay circuit 46 essentially matches this stage's timing to that of the other stages by eliminating the effect of time interval $T_P$ from the delay equations.

Figure 16:
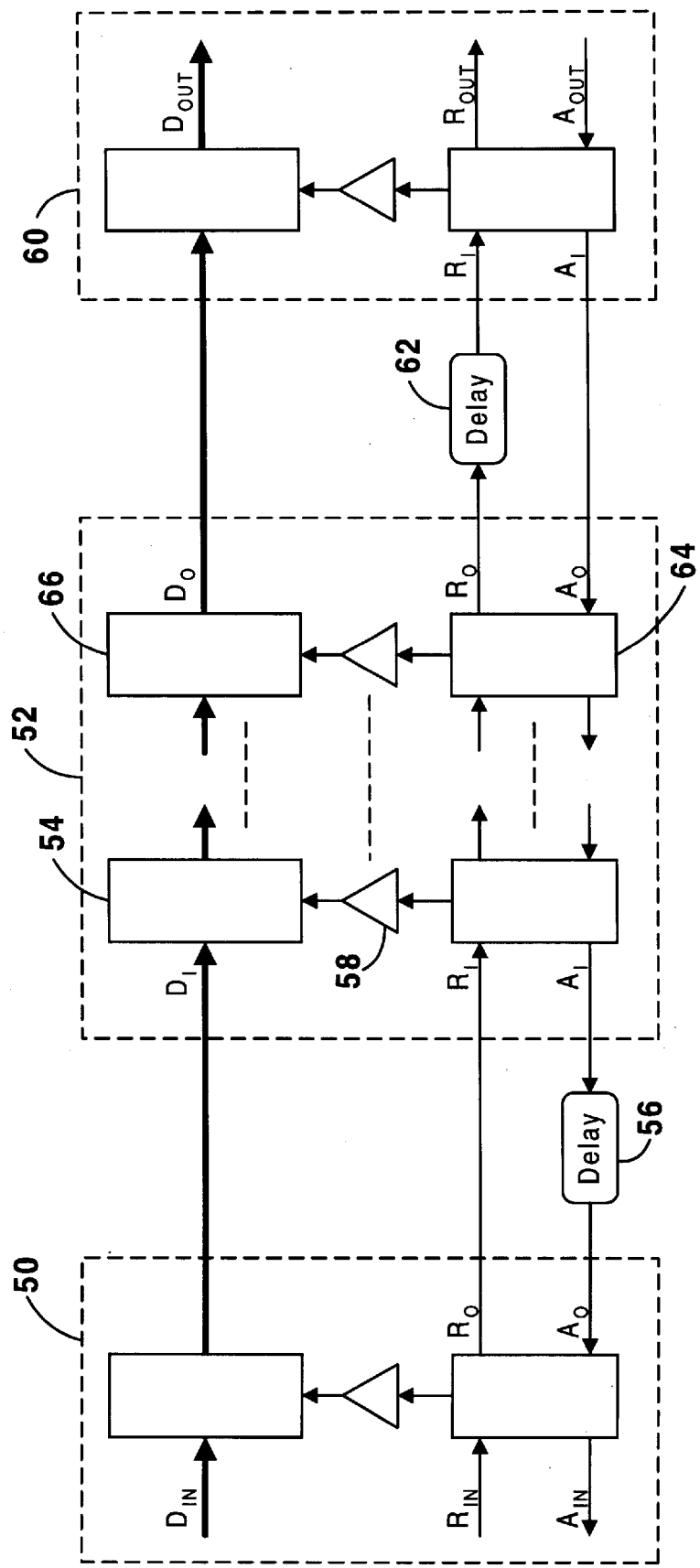
FIG. 16 is a block diagram showing an interface between a pipeline of the present invention and asynchronous external devices.

Because a pipeline incorporating the present invention must operate as a component of a circuit, its input and output must interface properly with the external devices that provide the source and destination for its data. The external devices are either asynchronous or synchronous. An example interface between an asynchronous source device 50 and a pipeline 52 of the present invention is shown in FIG. 16. In the general situation, no assumptions can be made about the operation of the source device 50 except that it will use the normal handshake protocol. This means that the data $D_I$ may disappear at the same time that an event is asserted on $A_I$ by the pipeline 52. Therefore, the pipeline 52 must hold off asserting $A_I$ until it is sure that the data $D_I$ is properly latched in the data register 54. To accomplish this, a delay line 56 is inserted between $A_I$ of the pipeline 52 and $A_O$ of the source device 50. Assuming that the data TSPLs and the $A_I$ TSPL have similar latch times, the minimum period of the delay is set to the worst-case delay period of the load signal buffer 58. Naturally, if some characteristics of the source device 50 are known, such as the delay between when $A_O$ is asserted and the data is no longer valid, this knowledge can be exploited to decrease the delay period, increasing throughput. An alternate to the delay line 56, using the buffered load signal $L_B$ to cause the $A_I$ event, is described above with reference to FIG. 10.

Also shown in FIG. 16 is an interface between the pipeline 52 and an asynchronous destination device 60. Since, once again, it must be assumed that the destination device 60 will use proper handshake protocol, $R_O$ must not occur until the output data $D_O$ is actually available to the destination device 60. This is accomplished by providing a delay line 62 having a period equivalent to the delay period through the XOR gate in the stage controller 64, the load signal buffer 68, and the data register 66. Essentially, the delay line 62 simulates the length time that the $R_O$ signal occurs before the output data $D_O$ is actually available. As above, known characteristics of the destination device 60 can be exploited to increase throughput.

Figure 17:
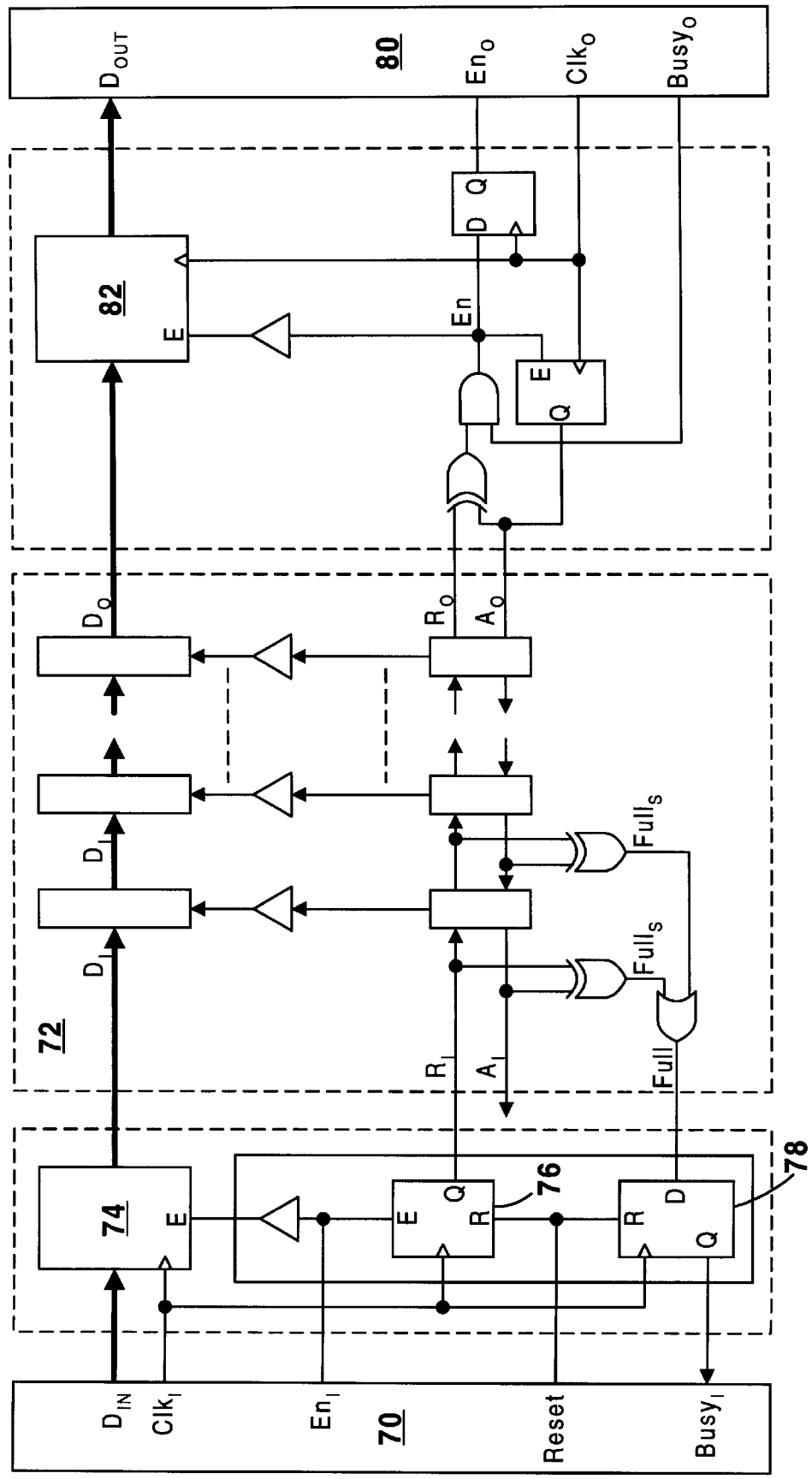
FIG. 17 is a block diagram showing an interface between a pipeline of the present invention and synchronous external devices.
Figure 18:
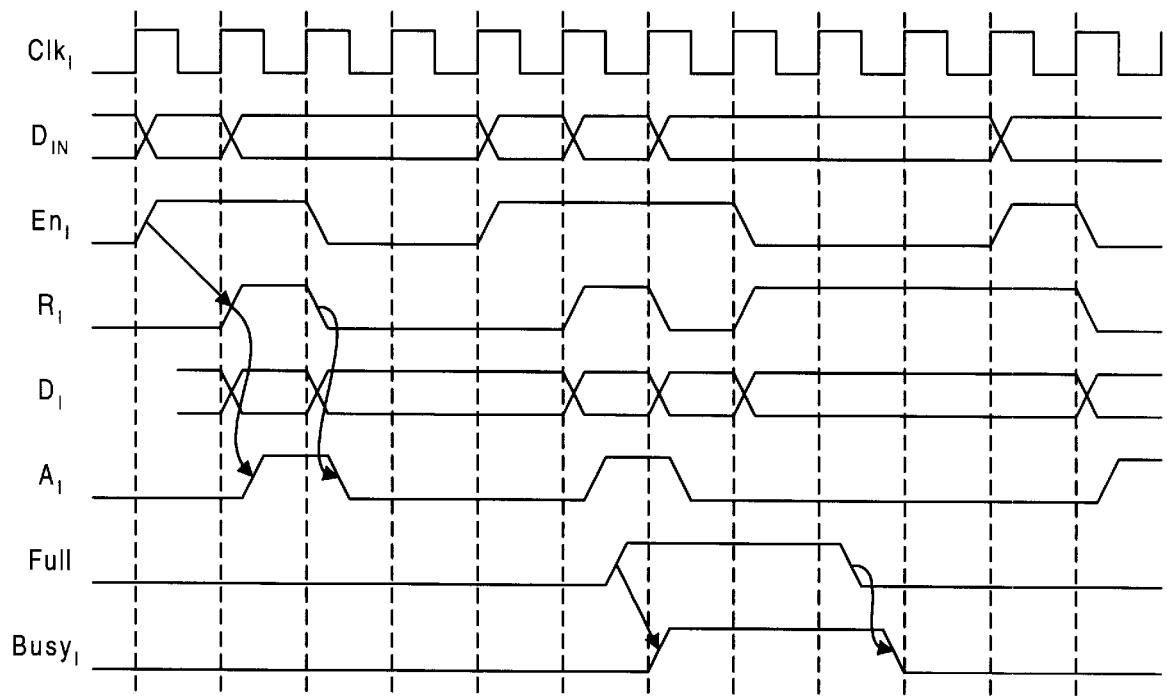
FIG. 18 is a timing diagram of the input interface of FIG. 17.

The more complicated and common situation is when the asynchronous pipeline must interface with a synchronous device such as a microprocessor or disk drive controller. Examples of such interfaces are shown in FIG. 17. At the input, the synchronous signals of the data source 70 must be translated to asynchronous signals for the pipeline 72. Following a reset, $R_I$ and $BUSY_{IN}$ are low and there is no activity until $En_{IN}$ is set high, as shown in the timing diagram of FIG. 18. When that occurs, the interface data register 74 and $R_I$ toggle flip-flop 76 become active. At the next rising edge of the clock $Clk_{IN}$, data $D_{IN}$ is latched into the interface data register 74 and an $R_I$ event occurs. The pipeline 72 processes the $R_I$ event and returns $A_O$, which is ignored by the synchronous circuitry. Meanwhile, if all stages of the pipeline 72 are holding data, the Full signal is clocked into the Busy flip-flop 78, signaling to the source device 70 that no more data can be accepted. Full is generated by the OR of a small number of Fulls signals from the first two to four successive individual stages at the input end of the pipeline. Fulls is generated by an XOR of $R_I$ and $A_I$, which essentially means that the data is available to a stage but has not yet been read by the stage.

Figure 19:
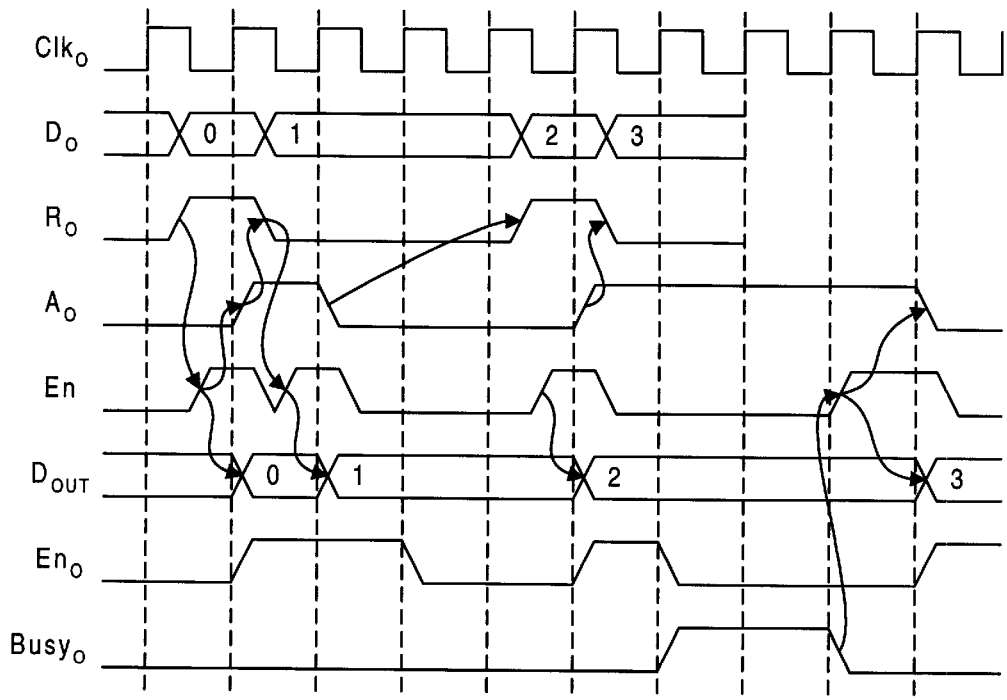
FIG. 19 is a timing diagram of the output interface of FIG. 17.

At the output, the asynchronous signals of the pipeline 72 must be translated to synchronous signals of the destination device 80. Following a reset, $A_O$, the output enable signal $En_O$, and the enable E of the interface data register 82 are low, as shown in the timing diagram of FIG. 19. It is assumed that $R_O$ and the destination device busy signal $Busy_O$ are initially low. Upon an $R_O$ event, the internal enable En is set, enabling the interface data register 82. On the rising edge of the next clock $Clk_O$, $D_O$ is stored in the interface data register 82 and is available at $D_{OUT}$, $En_O$ is set to indicate valid data $D_{OUT}$ to the destination device, and the $A_O$ T flip-flop 84 toggles to cause an event on $A_O$. When the $A_O$ event occurs, En goes low, disabling the interface data register 82 and causing $En_O$ to return to low at the next clock. If $Busy_O$ should rise, indicating that the destination device 80 cannot except data, the interface data register 82 will not be enabled, $En_O$ will not set, and the $A_O$ T flip-flop 84 will not toggle.

Thus it has been shown and described an asynchronous pipeline which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An asynchronous pipeline circuit comprising:
   (a) a plurality of stages coupled in series, each of said stages including a controller, a load signal buffer, and a processor;
   (b) said processor including a data latch and a logic circuit coupled in series, said logic circuit having a maximum input-to-output propagation time interval $T_P$;
   (c) said controller receiving an input request event from a previous stage and said controller receiving an output acknowledge event from a next stage, said output acknowledge event indicating that said next stage is able to receive data;
   (d) said controller providing an input acknowledge event to said previous stage after receiving said input request event, and said controller providing an output request event to said next stage after receiving both said input request event and said output acknowledge event, said output request event occurring at least a time interval $T_C+T_P$ after said input request event, said time interval $T_C$ being substantially the same for all of said stages;
   (e) said controller providing a load signal to said load signal buffer and said load signal buffer providing a buffered load signal to said data latch at a time interval $T_Z$ after said output request event, said time interval $T_Z$ being substantially the same for all of said stages; and
   (f) said data latch storing input data from said previous stage upon reception of said buffered load signal and said logic circuit providing output data to said next stage at a time interval $T_D+T_P$ after said buffered load signal, said time interval $T_D$ being substantially the same for all of said stages and less than or equal to said time interval $T_C$;
   (g) whereby said output data is provided to said next stage at a time interval $T_Z+T_D$ after said output request event and said output data is stored by said next stage at time interval $T_C+T_Z$ after said output request event.

2. The asynchronous pipeline circuit of claim 1 wherein a first stage of said pipeline is connected to a source device by an input interface circuit and a last stage of said pipeline is connected to a destination device by an output interface circuit.

3. The asynchronous pipeline circuit of claim 2 wherein said source device is asynchronous and said input interface circuit delays said input acknowledge event to said source device until at least said buffered load signal occurs.

4. The asynchronous pipeline circuit of claim 2 wherein said destination device is asynchronous and said output interface circuit delays said output request event to said destination device until said output data is available.

5. The asynchronous pipeline circuit of claim 2 wherein said source device is synchronous and said input interface circuit converts synchronous handshake signals of said source device to said input request event and said input acknowledge event.

6. The asynchronous pipeline circuit of claim 2 wherein said destination device is synchronous and said output interface circuit converts said output request event and said output acknowledge event to synchronous handshake signals for said destination device.

7. The asynchronous pipeline circuit of claim 1 wherein each of said stages is located physically adjacent to said previous stage and said next stage.

8. The asynchronous pipeline circuit of claim 1 wherein said controller employs two-cycle signaling.

9. The asynchronous pipeline circuit of claim 1 wherein said input acknowledge event is provided after said load signal.

10. The asynchronous pipeline circuit of claim 1 wherein said output data is the same as said input data and $T_P$ is substantially zero.

11. An asynchronous first-in-first-out queue comprising:
   (a) a plurality of stages coupled in series, each of said stages including a controller, a load signal buffer, and a data latch;
   (b) said controller receiving an input request event from a previous stage and said controller receiving an output acknowledge event from a next stage, said output acknowledge event indicating that said next stage is able to receive data;
   (c) said controller providing an input acknowledge event to said previous stage after receiving said input request event, and said controller providing an output request event to said next stage after receiving both said input request event and said output acknowledge event, said output request event occurring at least a time interval $T_C$ after said input request event, said time interval $T_C$ being substantially the same for all of said stages;
   (d) said controller providing a load signal to said load signal buffer and said load signal buffer providing a buffered load signal to said data latch at a time interval $T_Z$ after said output request event, said time interval $T_Z$ being substantially the same for all of said stages; and
   (e) said data latch storing input data from said previous stage upon reception of said buffered load signal and said logic circuit providing output data to said next stage at a time interval $T_D$ after said buffered load signal, said time interval $T_D$ being substantially the same for all of said stages and less than or equal to said time interval $T_C$;
   (f) whereby said output data is provided to said next stage at a time interval $T_Z+T_D$ after said output request event and said output data is stored by said next stage at time interval $T_C+T_Z$ after said output request event.

12. The asynchronous first-in-first-out queue of claim 11 wherein a first stage of said pipeline is connected to a source device by an input interface circuit and a last stage of said pipeline is connected to a destination device by an output interface circuit.

13. The asynchronous first-in-first-out queue of claim 12 wherein said source device is asynchronous and said input interface circuit delays said input acknowledge event to said source device until at least said buffered load signal occurs.

14. The asynchronous first-in-first-out queue of claim 12 wherein said destination device is asynchronous and said output interface circuit delays said output request event to said destination device until said output data is available.

15. The asynchronous first-in-first-out queue of claim 12 wherein said source device is synchronous and said input interface circuit converts synchronous handshake signals of said source device to said input request event and said input acknowledge event.

16. The asynchronous first-in-first-out queue of claim 12 wherein said destination device is synchronous and said output interface circuit converts said output request event and said output acknowledge event to synchronous handshake signals for said destination device.

17. The asynchronous first-in-first-out queue of claim 11 wherein each of said stages is located physically adjacent to said previous stage and said next stage.

18. The asynchronous first-in-first-out queue of claim 11 wherein said controller employs two-cycle signaling.

19. The asynchronous first-in-first-out queue of claim 11 wherein said input acknowledge event is provided after said load signal.

20. An asynchronous pipeline circuit comprising:

(a) a plurality of stages coupled in series, each of said stages including a controller, a load signal buffer, and a processor;

(b) said processor including a data latch and a logic circuit coupled in series, said logic circuit having a maximum input-to-output propagation time interval $T_P$;

(c) said controller employing two-cycle signaling;

(d) said controller receiving an input request event from a previous stage and said controller receiving an output acknowledge event from a next stage, said output acknowledge event indicating that said next stage is able to receive data;

(e) said controller providing an input acknowledge event to said previous stage after receiving said input request event, and said controller providing an output request event to said next stage after receiving both said input request event and said output acknowledge event, said output request event occurring at least a time interval $T_C+T_P$ after said input request event, said time interval $T_C$ being substantially the same for all of said stages;

(f) said controller providing a load signal to said load signal buffer and said load signal buffer providing a buffered load signal to said data latch at a time interval $T_Z$ after said output request event, said time interval $T_Z$ being substantially the same for all of said stages;

(g) said controller providing said input acknowledge event after said load signal;

(h) said data latch storing input data from said previous stage upon reception of said buffered load signal and said logic circuit providing output data to said next stage at a time interval $T_D+T_P$ after said buffered load signal, said time interval $T_D$ being substantially the same for all of said stages and less than or equal to said time interval $T_C$;

(i) each of said stages being located physically adjacent to said previous stage and said next stage; and (j) a first stage connected to a source device by an input interface circuit and a last stage connected to a destination device by an output interface circuit;

(k) whereby said output data is provided to said next stage at a time interval $T_Z+T_D$ after said output request event and said output data is stored by said next stage at time interval $T_C+T_Z$ after said output request event.

21. The asynchronous pipeline circuit of claim 20 wherein said output data is the same as said input data and $T_P$ is substantially zero.

22. An asynchronous first-in-first-out queue comprising:

(a) a plurality of stages coupled in series, each of said stages including a controller, a load signal buffer, and a data latch;

(b) said controller employing two-cycle signaling;

(c) said controller receiving an input request event from a previous stage and said controller receiving an output acknowledge event from a next stage, said output acknowledge event indicating that said next stage is able to receive data;

(d) said controller providing an input acknowledge event to said previous stage after receiving said input request event, and said controller providing an output request event to said next stage after receiving both said input request event and said output acknowledge event, said output request event occurring at least a time interval $T_C$ after said input request event, said time interval $T_C$ being substantially the same for all of said stages;

(e) said controller providing a load signal to said load signal buffer and said load signal buffer providing a buffered load signal to said data latch at a time interval $T_Z$ after said output request event, said time interval $T_Z$ being substantially the same for all of said stages;

(f) said controller providing said input acknowledge event after said load signal;

(g) said data latch storing input data from said previous stage upon reception of said buffered load signal and said logic circuit providing output data to said next stage at a time interval $T_D$ after said buffered load signal, said time interval $T_D$ being substantially the same for all of said stages and less than or equal to said time interval $T_C$;

(h) each of said stages being located physically adjacent to said previous stage and said next stage; and (i) a first stage connected to a source device by an input interface circuit and a last stage connected to a destination device by an output interface circuit;

(j) whereby said output data is provided to said next stage at a time interval $T_Z+T_D$ after said output request event and said output data is stored by said next stage at time interval $T_C+T_Z$ after said output request event.

* * * * *